United States Patent [19]

Groff

[11] 4,446,334

[45] May 1, 1984

[54] TELEPHONE NUMBER CODING DEVICE

[76] Inventor: James W. Groff, P.O. Box 38, Morgan Hill, Calif. 95037

[21] Appl. No.: 432,272

[22] Filed: Jan. 31, 1983

[51] Int. Cl.³ .................. H04M 1/21; H04M 11/02
[52] U.S. Cl. .......................... 179/81 R; 179/84 C; 179/84 SS
[58] Field of Search ............. 179/84 C, 84 A, 84 R, 179/84 VF, 84 SS, 6.16, 6.11, 6.07, 5.5, 5 P, 5 R, 2 A, 99 H, 18 AB, 89, 81 R

[56] References Cited

U.S. PATENT DOCUMENTS 4,405,839 9/1983 Groff .................................. 179/84 C Primary Examiner—A. D. Pellinen
Assistant Examiner—James L. Dwyer

[57] ABSTRACT

A telephone number coding device for eliminating unwanted telephone calls by requiring that a caller dial a special number code, in addition to a regular telephone number, in order for a telephone connected to the device to "ring." The coding device contains a sound generator which simulates telephone ring signals to alert the device user of an incoming call only when a caller dials a special number code consisting of one or more digits. Since the code is revealed only to those the device user wishes to have call him, all unwanted calls are eliminated. Thumbwheel switches are provided on the device for the user to preselect a desired code, and allow instant code change at any time. The coding device includes dual detectors, allowing a caller to dial a required code using standard telephone dual tone multifrequency (DTMF) tones, if a tone telephone is available, and allowing a caller to "dial" a required code by rapidly tapping on a telephone mouthpiece so that each series of taps equals each digit of the code, if a pushbutton or rotary telephone is available. The coding device automatically silences the ringer mechanism of a telephone connected to it, and also provides an accessory which silences the ringer mechanism of an extension telephone used with the device. Either a primary or extension telephone can be used to answer calls which are received by the coding device. All cooperating telephones function normally, except that the ringer mechanisms are silenced.

16 Claims, 8 Drawing Figures

TELEPHONE NUMBER CODING DEVICE

BACKGROUND OF THE INVENTION

1. Field of the Invention

The present invention relates to the field of automatic telephone answering devices, and is more particularly directed to a telephone number coding device requiring that a caller dial a special number code, in addition to a regular telephone number, in order to actuate a ring signal for a telephone attached to the device.

2. Description of the Prior Art

With the advent of dual tone multi-frequency (Touch Tone ®) telephone systems, it is possible to utilize a telephone keypad for more than simply dialing a telephone number. Once a regular telephone number has been dialed and the connection completed, additional code numbers can be dialed to accomplish such things as computer access, paging, electronic funds transfer, alternative long distance calling, and remote control of alarms, locks, electrical appliances, and surveillance systems. Although the current state of the art allows virtually the entire planet to be linked with our personal telephone, whether wired or wireless, there are times when the phone's incessant ringing is no longer welcomed. Many of the calls are wrong numbers, solicitors, salesmen, or simply those to whom we do not wish to speak. Even with an "unlisted" number, many of the nuisance calls manage to get through. The telephone rings again, and we find ourselves in George Orwell's world of 1984: ". . . Always the eyes watching you and the voice enveloping you. Asleep or awake, working or eating, indoors or out of doors, in the bath or bed—no escape . . . "

One welcome telephone advancement is the modular plug. At least one can pull the plug to physically disconnect the phone. Or one can install a special switch to silence the ring. Although these methods do offer the telephone subscriber some degree of control over his phone, important calls can be missed when the telephone is disconnected or silenced. To assure receipt of wanted calls without becoming harried by nuisance calls, other alternatives can be used. An obvious one is the telephone answering device which is probably the best known and most widely used telephone accessory. Users of an answering machine can screen all calls by having the machine record all incoming messages. After rewinding the tape, the machine user can then listen to each message and decide which calls he wishes to return. The disadvantages here are that the recording tape must be reviewed before selected calls can be returned, and non-local calls will be paid for by the machine user when any of these non-local calls are returned. Some types of answering machines allow the user to monitor all incoming calls through a speaker, whereby the answering machine is immediately disabled if a call is personally answered. A disadvantage to this often helpful feature is that the machine user must remain physically near the answering machine in order to monitor incoming calls on the machine's speaker.

An additional alternative can be provided in the form of a telephone number coding device. The device can be plugged into a normally used telephone line modular jack, and the telephone, in turn, plugged into a modular jack provided on the rear surface of the device. In use the device responds only to a special number code of the user's choosing. In effect, the device causes its attached telephone to become "hidden" from all who do not know the special code, and can, therefore, convert a standard telephone to a "hidden telephone," or "cryptophone." The special number code required by the coding device can consist of any reasonable number of digits which must be dialed by the caller after a regular telephone number has been dialed and a connection completed. If a special number code is correctly dialed, the coding device is actuated and notifies the user that a call is being received. Only at this time will the person being called be aware of an incoming call, since connection of a telephone to the telephone number coding device automatically disables the ringer mechanism of the telephone. The required code number, therefore, provides the device user with a secret, "unlisted" telephone number, regardless of whether or not the telephone is already unlisted with the telephone company. Thus, the telephone subscriber obtains total control over his telephone by receiving calls from only those to whom he has revealed the special telephone number code. If the coding device owner so desires, the special code can be easily and instantly changed to halt all calls received via a previous code. It is, therefore, a general object of the present invention to provide a telephone number coding device which converts a standard telephone to a "cryptophone," or "hidden telephone" by requiring that a special digital code be dialed subsequent to a regular telephone number, in order for the telephone to "ring."

SUMMARY OF THE INVENTION

Accordingly, the primary object of the present invention is to provide an electronic telephone number coding device which, when connected between a telephone line and a telephone, requires that a special telephone number code be dialed by a caller before the device user is notified of an incoming call. A further object of the present invention is to provide a coding device which includes means for easily and instantly changing a required special code at the user's discretion. Another object of the present invention is to provide a coding device which includes means for easily connecting the device to a telephone line and for connecting a telephone to the device. A further object of the present invention is to provide a coding device which includes means to automatically disable the ringer mechanism of a telephone connected to the device while, at the same time, allowing normal use of the telephone for all incoming and outgoing calls. An additional object of the present invention is to provide additional silencing means which, when plugged into a telephone line modular jack, disable the ringer mechanism of an extension telephone which is plugged into the silencing means and which is used in conjunction with the coding device while, at the same time, allowing normal use of the extension telephone for all incoming and outgoing calls. A further object of the present invention is to provide a coding device which contains an electronic sound generator to alert the device user of a caller who has correctly dialed a required special number code. Another object of the present invention is to provide a coding device which includes easily accessible controls for adjusting pitch and volume of the electronic sound generator. An additional object of the present invention is to provide a coding device which includes code detection means allowing the caller to use a tone, pushbutton, or rotary telephone. A further object of the present invention is to provide a coding device which includes timing means causing the device to automatically hang up on a caller who does not correctly dial a required code within a predetermined time period. Another object of the present invention is to provide a coding device which includes additional timing means, causing the device to automatically hang up following a predetermined time period, if the device user does not answer his telephone. A further object of the present invention is to provide a coding device which is immediately and automatically disabled when an attached telephone, or a cooperating extension telephone, is answered. Another object of the present invention is to provide a coding device which includes easily accessible switching means, allowing the device user to disable the device and use his telephone in a normal fashion without disconnecting the telephone from the coding device. Additional advantages and features of the present invention will be apparent from the following description of the preferred embodiment of the invention.

A preferred embodiment of the present invention provides a compact, AC-powered telephone number coding device which can be used with any telephone and which requires that a special digital code be dialed, in addition to a regular telephone number, in order for the device user to be notified of an incoming call. The preferred embodiment of the present invention provides the device user with a four-digit "unlisted" telephone number which is determined by the position of four thumbwheel switches which are provided on the face of the device. The switches allow the device user to select his own "unlisted" number which can be changed as often as desired, thus assuring elimination of unwanted calls.

In use, the device is plugged into a modular jack of a telephone line, and a telephone is plugged into a modular jack provided on the rear surface of the device. Connection of a telephone to the device automatically disables the ring mechanism of the telephone, thereby preventing the telephone from ringing at the onset of any incoming call which is initiated by a caller dialing a regular telephone number. A correctly dialed regular telephone number does, however, cause the device to automatically answer an attached telephone following one ring, which is heard by the caller but not by the device user.

If the caller then correctly dials a special number code which has been selected by the device user, an electronic sound generator contained within the device simulates the ringing sound of an attached telephone, thereby notifying the device user that he is being called. Controls are provided on the face of the device, allowing the user to adjust both pitch and volume of the associated sound generator. If a caller does not know the special number code, or fails to dial it correctly, the device automatically hangs up after a predetermined time interval. If the device user fails to answer his phone after the sound generator is actuated for a predetermined number of "rings," the device also releases the telephone line (hangs up). As in normal telephone use, both the caller and the person being called hear the "ring" tone when the electronic sound generator is actuated.

When extension telephones are used in conjunction with a primary telephone attached to the telephone number coding device, small modular silencing devices are connected between each extension phone and the telephone line, causing the extension telephones to function normally, except that their ringer mechanisms are disabled. When a valid call is received by the coding device user, lifting the receiver of the primary telephone or an extension phone to answer the call automatically disables the device, causing the electronic sound generator to stop "ringing." A switch provided on the face of the coding device allows the user to selectively disable the coding device so that his telephone rings normally. This feature prevents the device's automatic answering circuit from answering an attached telephone when the device user expects to be away, and, therefore, does not require the caller to pay for a telephone call which will not be answered.

DESCRIPTION OF THE PREFERRED EMBODIMENT

Figure 1:
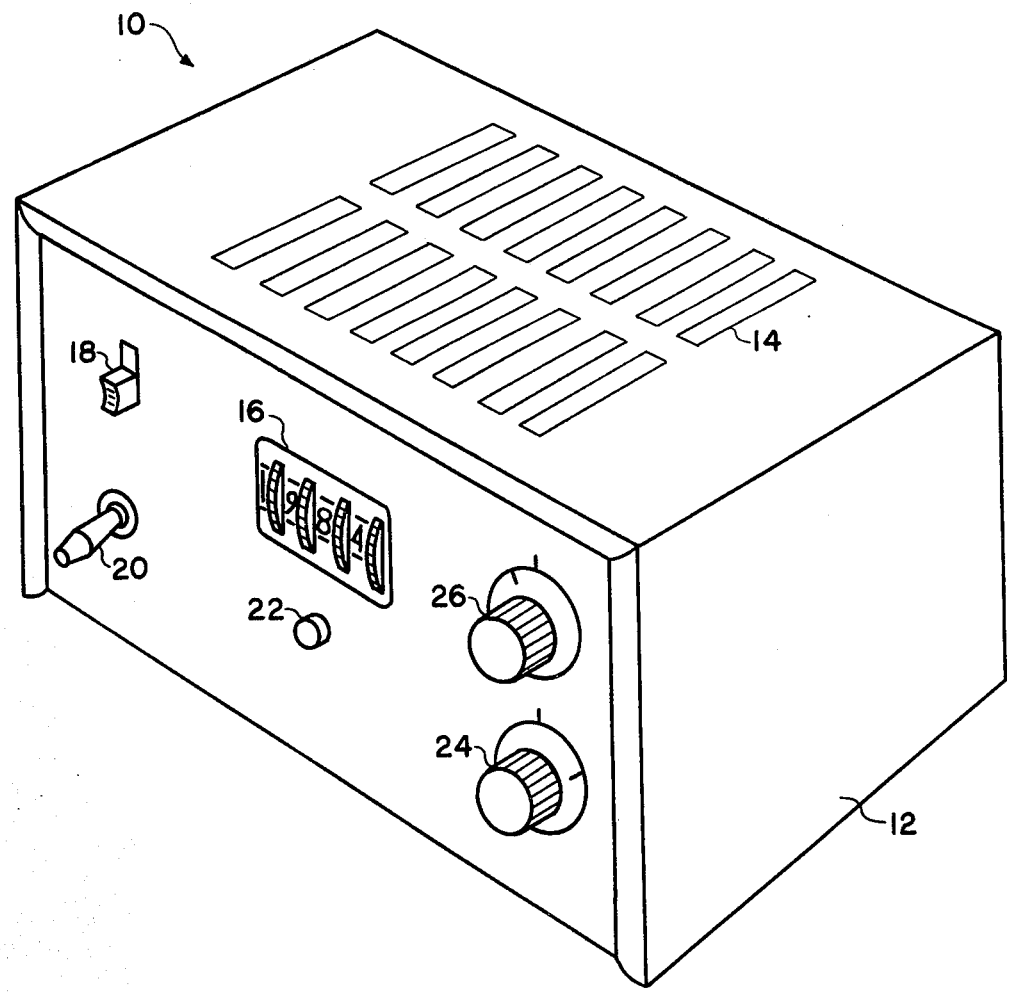
FIG. 1 is a perspective view of the telephone number coding device of the present invention.

Referring to FIG. 1, a telephone number coding device 10 is shown. The exterior of coding device 10 consists of a housing 12, a speaker grille 14, thumbwheel switches 16, disabling slide switch 18, illuminated power switch 20, line hold indicator LED 22, pitch control 24, and volume control 26. A line cord and phone cord (not shown) extend from the rear of the housing, allowing the coding device to be plugged into a convenient AC outlet and telephone line modular jack. A phone which is used in conjunction with the coding device is plugged into a modular jack (not shown) also provided on the rear of the housing. The device is in a standby mode when power switch 20 is in an up position. Slide switch 18 must also be in an up position in order for the device to function. Otherwise, the attached telephone line function as if it is directly connected to a phone line, and will ring normally when any call is received.

Thumbwheel switches 16 are rotated to expose a four digit code selected by the device user. The code number "1984" is shown in FIG. 1, and will be used as an example. Since connection of a telephone to the coding device 10 automatically disables the telephone ring mechanism (unless slide switch 18 is in a down position), no rings are heard by the device user until a caller has dialed a regular telephone number, plus the selected special number code of "1984." If the code has been dialed correctly, an intermittent, simulated ring tone will be heard from speaker grille 14 until the telephone receiver is lifted, or for a predetermined number of rings if the telephone is not answered. Either control 24 or 26 can be adjusted to alter pitch or volume of the simulated ring tone. Line hold LED indicator 22 is illuminated whenever the coding device 10 receives an incoming call, and remains illuminated until a call is answered or until automatic line release occurs.

Figure 2:
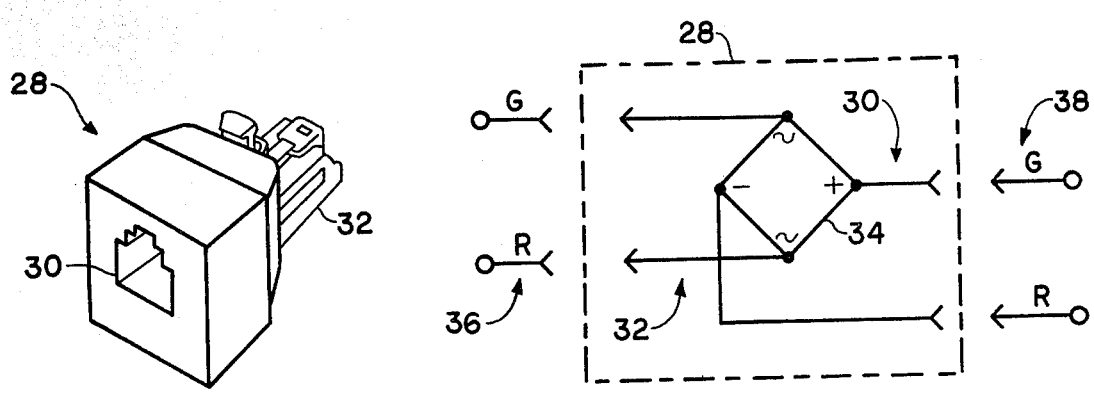
FIG. 2 is a perspective view and schematic diagram of a modular telephone ring silencer of the present invention.

Referring next to FIG. 2, a perspective view and schematic diagram of a modular telephone ring silencer 28 are shown. The modular telephone ring silencer is used to disable the ring mechanism of an extension telephone which is used in conjunction with telephone number coding device 10. When using ring silencer 28, only an electronic sound generator contained within the coding device is heard to ring when a special number code is correctly dialed. Ring silencer 28 contains a modular jack 30 which is internally connected to a modular plug 32 via a full-wave bridge rectifier 34. The tip (G) and ring (R) wires of a telephone line 36 are connected to the rectifier's AC terminals. The tip (G) wire of an extension telephone cord 38 is connected to the rectifier's positive terminal; the ring (R) wire of cord 38 is connected to the rectifier's negative terminal.

In use, an extension telephone is plugged into modular jack 30, and modular plug 32 is then plugged into the normally used telephone line modular jack. Since the ringer mechanism of a telephone is wired in series with a capacitor, so only AC ring current can flow through the ringer, insertion of a bridge rectifier between the telephone line and telephone effectively disables the ringer mechanism. The bridge rectifier converts AC ring current to DC current which, in turn, is blocked by the above capacitor, causing the ringer to remain silent. Audio signals to and from the telephone ride on top of a DC bias, and are not interfered with by the inclusion of a rectifier. Thus, an extension telephone connected to modular telephone ring silencer 28 does not ring in response to a line ring signal, but can be used normally in answering a call or in calling out. A similar configuration is utilized for a primary telephone attached to coding device 10, and will be subsequently described with reference to FIG. 4. If an extension telephone is already provided with a ring silencer switch, ring silencer 28 will, of course, not be needed.

Figure 3:
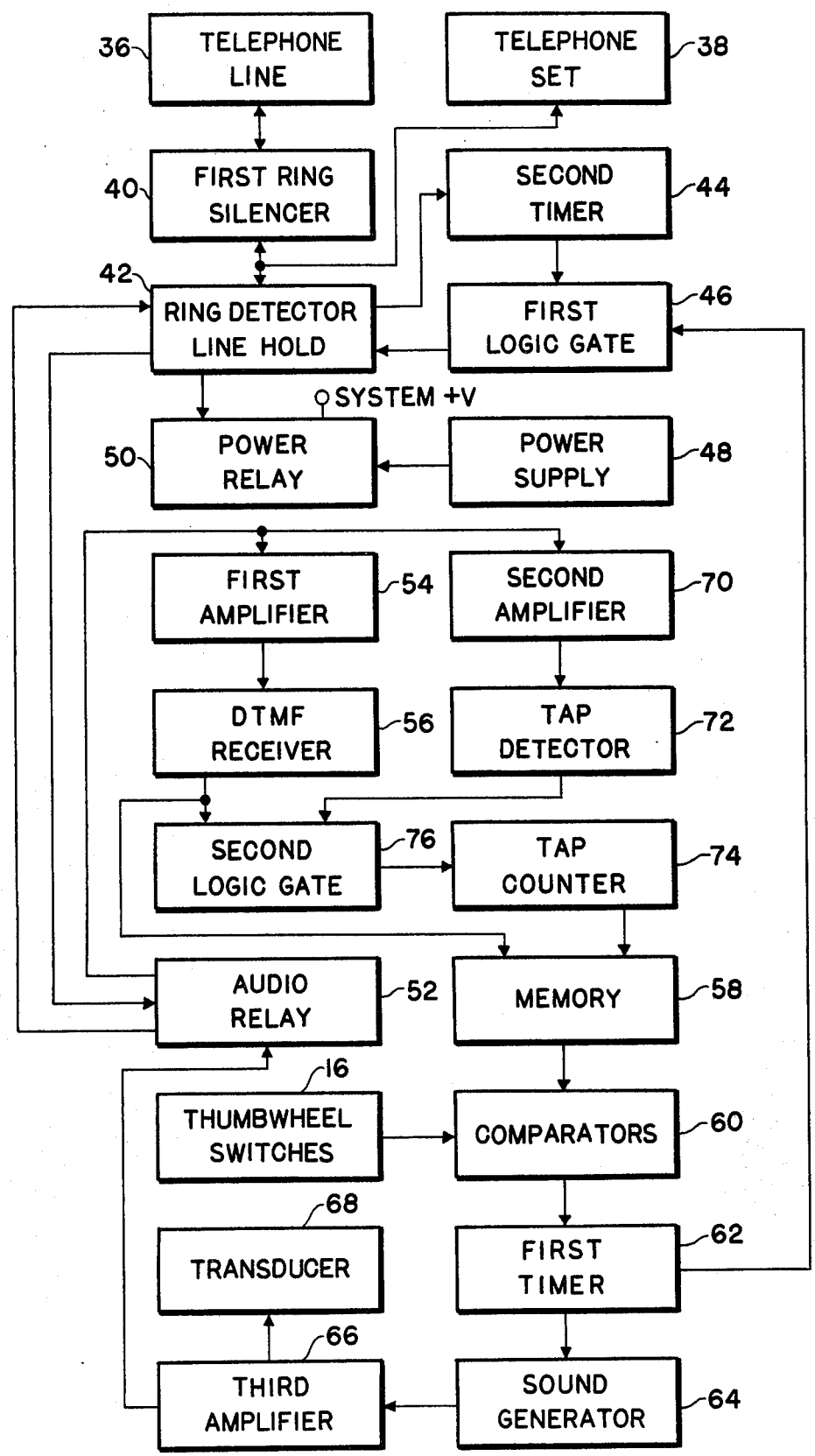
FIG. 3 is a block diagram of the telephone number coding device of the present invention.

Referring now to FIG. 3, a block diagram containing the main elements of telephone number coding device 10 is shown. The diagram will be used to briefly describe the coding device. A telephone line 36 is connected to the device via a telephone cord and attached modular plug provided at the rear of housing 12 (FIG. 1), while a telephone set 38 is connected to the device via a modular jack also provided at the rear of housing 12. A rectifier comprising a first ring silencer 40 connects telephone line 36 with the coding device and telephone set 38, disabling the ringer mechanism of the telephone set. When a regular telephone number of telephone set 38 is dialed, the ring signal appearing on telephone line 36 is detected, causing the telephone line to be seized and held by a ring detector and line hold circuit 42. If a special number code is not correctly dialed by the caller subsequent to automatic answering of his call, a second timer 44 releases telephone line 36 following a predetermined time interval (20 seconds, for example). If a special number code is correctly dialed by the caller, the output of second timer 44 is inhibited by a first logic gate 46 causing the telephone line to be held for a longer, predetermined time interval, or until telephone set 38 is answered by the device user.

A 5-volt DC regulated power supply 48, which is connected to a convenient AC wall outlet via a line cord and plug, provides power to the associated circuitry of ring detector and line hold circuit 42, as well as to the remainder of the coding device system, via a power relay 50. Most of the circuits yet to be briefly described are not powered until ring detector and line hold circuit 42 is triggered by a ring signal appearing on telephone line 36. Subsequent to a ring signal, coding device 10 is totally powered and enabled to receive a special number code from a caller. Since there are two distinct modes in which a caller can dial a special number code, each will be separately described.

A first dialing mode utilizes dual tone multi-frequency (DTMF) tones which are generated by a caller when he depresses the various keys of a tone telephone keypad. Once the caller hears the coding device answer following one ring (which is not heard by the device user), he then uses his tone telephone to dial four additional digits (such as have been used in a previous example) which have been disclosed to him by the device user. Subsequent to ring detection and line hold, sound appearing on telephone line 36 is conducted from ring detector and line hold circuit 42, via an audio relay 52, to a first amplifier 54. The sound, consisting of DTMF tones, is amplified and conducted to a DTMF receiver 56 which, in turn, provides a binary-coded 2-of-8 output for each pair of tones which are detected. Next, the binary-coded 2-of-8 output is conducted to a four-stage memory 58. As each DTMF tone is received, it is stored by the memory in binary code until all four digits of the special number code have been received. When this occurs, the stored digits are compared by comparators 60 with another four digits which have been previously selected by rotation of four, ten-position, binary-coded decimal thumbwheel switches 16.

If a caller has correctly dialed the special number code, comparators 60 produce a logic output which triggers a first timer 62. When triggered, timer 62 inhibits the output of second timer 44 via gate 46, preventing line release and actuating sound generator 64. The sound generator output is amplified by third amplifier 66 and reproduced by a transducer 68. The resulting simulated ring tones are heard by both the device user and the caller, since an attenuated portion of the third amplifier output is conducted back to the phone line via audio relay 52 and ring detector and line hold circuit 42. When a call is answered by the device user, the coding device is automatically disabled and sound generator 64 is turned off. If a call is unanswered by the device user, first timer 62 causes the telephone line to be released when the timer cycle is complete (after fifteen rings, for example).

For callers using rotary or non-tone push button telephones, a second mode of "dialing" is used to actuate first timer 62 of the coding device. Once a regular telephone number has been dialed in the usual manner and the connection made, a pen or pencil is sharply tapped against the rim of the telephone mouthpiece in exact correspondence with the respective digits of a special number code to be dialed. The tapping may be done as rapidly as desired, as long as each tap is distinct, and a minimal 0.5-second pause occurs between each series of taps representing a digit. Using the earlier example, a special number code of "1984" is "dialed" by tapping once, nine times, eight times, and four times with a minimal half-second pause between each digit. As with DTMF tones, the taps are conducted from ring detector and line hold circuit 42, via audio relay 52, to a second amplifier 70. After amplification, the taps are detected by a tap detector circuit 72 and counted by a tap counter 74 via a second logic gate 76.

Since DTMF tones as well as taps can actuate tap detector circuit 72, while taps do not actuate DTMF receiver 56, second logic gate 76 is provided to inhibit the tap detector output when DTMF tones are present. With this arrangement, only taps are clocked into tap counter 74, subsequently clocked into memory 58, and compared with code digits which have been preselected by thumbwheel switches 16. If the taps are correct, first timer 62 is triggered and simulated ring tones are heard from transducer 68. The transducer is positioned directly below speaker grille 14 shown in FIG. 1.

Figure 4:
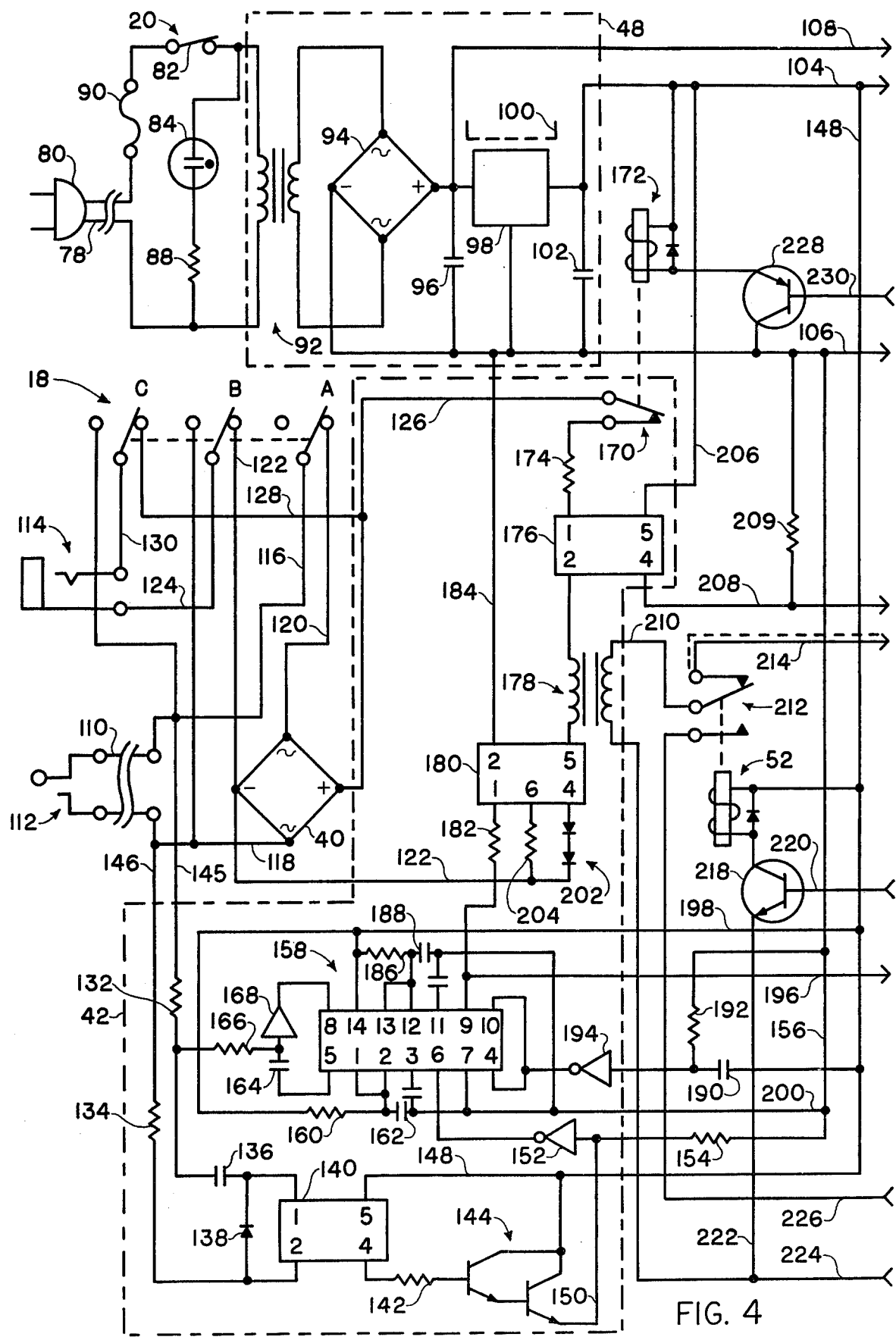
FIG. 4 is a schematic diagram of a power plug, illuminated power switch, power supply, modular plug, modular jack, bridge rectifier, ring detector and line hold circuit, line release relay, and audio relay of the present invention.

Referring now to FIG. 4, a power plug, illuminated power switch, power supply, modular plug, modular jack, bridge rectifier, ring detector and line hold circuit, line release relay, and audio relay are shown in a schematic diagram. The power supply 48 of telephone number coding device 10 is energized through a line cord 78 and attached plug 80 which is inserted into a convenient AC outlet. An illuminated power switch 20, comprising a SPST switch 82, a self-contained neon lamp 84 and dropping resistor 88, is provided on the face of the coding device, allowing power supply 48 to be turned on and off, whereby neon lamp 84 glows when the power supply is "on." A fast-blow fuse 90 is provided in series with line cord 78 and switch 20 to prevent damage in the event of a short circuit or overload. The 120 VAC input is stepped down to 12.6 VAC by a transformer 92 and rectified by a full-wave bridge rectifier 94. A large electrolytic capacitor 96 is connected between the rectifier's positive and ground outputs to filter the pulsating DC output prior to regulation at 5 volts by a voltage regulator 98. To assure maximum steady state usable output current of regulator 98, a heat sink 100 is attached to the case of the regulator. A small tantalum capacitor 102 is connected between the regulator +V output and ground to stabilize regulator operation and to minimize line noise. At this point, system +V appears on line 104, and ground appears on line 106. Line 108 conducts unregulated +V, which will be later discussed with reference to DTMF receiver 56.

The coding device is connected to a convenient telephone line modular jack via a telephone cord 110 and attached modular plug 112. A telephone which is to be used in conjunction with the device is plugged into a modular jack 114 provided on the rear surface of the device. When modular plug 112 is plugged into a telephone line 36 (FIG. 3), the tip wire is conducted on line 116 and the ring wire is conducted on line 118. A 3PDT slide switch 18 is provided to directly connect a telephone plugged into jack 114 with a telephone line which is connected via plug 112 when switch 18 is in a first position. In this mode the telephone rings normally and operates independently of the coding device. When slide switch 18 is in a second position, a cooperating telephone is connected to the telephone line via a full-wave bridge rectifier which comprises a first ring silencer 40.

FIG. 4 illustrates switch 18 in a second position, allowing the tip wire to be conducted, via line 116, switch terminal A, and line 120, to the upper AC terminal of rectifier 40. The ring wire is conducted directly to the lower AC rectifier terminal via line 118. The rectifier ground output is conducted to ring detector and line hold circuit 42 via line 122, and to the telephone set ring wire via line 122, switch terminal B, line 124, and modular jack 114. The positive rectifier output is conducted to ring detector and line hold circuit 42 via line 126, and to the telephone set tip wire via line 128, switch terminal C, line 130, and modular jack 114. In this configuration, rectifier 40 serves two purposes: (1) to define polarity for ring detector and line hold circuit 42, since some telephone systems reverse polarity upon connection of the calling number to the called number, and (2) to disable the ringer mechanism of a telephone set plugged into jack 114, since any AC ring signal is rectified and consequently blocked by a series capacitor within the ringer mechanism. As previously noted, the rectifier comprises a first ring silencer 40; a rectifier contained within the modular telephone ring silencer shown in FIG. 2 comprises a portion of a second ring silencer 28.

Briefly, ring detector and line hold circuit 42 senses a high AC voltage on telephone line 36 due to the presence of a ring signal, and subsequently triggers a semiconductor switch which, in turn, loads the telephone line with a resistance which is somewhat higher than that of a telephone which is off-hook. This arrangement automatically holds the telephone line (as if the telephone were physically answered) until the above semiconductor switch is turned off. Additional elements, such as an optoisolator and audio transformer, are also connected across the telephone line to provide a logic control signal and audio transfer to and from the remainder of the coding device circuit.

Successful operation of ring detector and line hold circuit 42 depends upon four distinct voltage levels present on a telephone line, depending on whether the line is in a standby mode when the telephone is on-hook and no call is being received; whether the line is conducting a ring signal; whether the line is in a hold mode following receipt of a call; and whether the telephone is off-hook following receipt of a call. Although voltage levels differ slightly from system to system, they are approximately 48 volts, 86 volts rms, 20 volts, and 5 volts, respectively.

The ring detector of ring detector and line hold circuit 42 is comprised of current limiting resistors 132 and 134, an input capacitor 136, a diode 138, a photo-Darlington optoisolator 140, a bias resistor 142, and a Darlington transistor 144. Any ring signal appearing on telephone line 36 is conducted, via plug 112 and line 110, on lines 145 and 146 which are parallel connected with lines 116 (corresponding to the line tip wire) and 118 (corresponding to the line ring wire). Line 145 is connected, via a capacitor 136, to the anode (pin 1) of a gallium arsenide infrared emitting diode of a 4N33 photo-Darlington optoisolator 140, and line 146 is connected to the cathode (pin 2) of the above diode. Current limiting resistors 132 and 134 are selected to conduct sufficient ring current to illuminate the diode of optoisolator 140 only when a ring signal of approximately 86 volts rms or more appears on an associated telephone line 36. Nominal 48-volt standby telephone line current is not sufficient to illuminate the above infrared diode. To assure that the ring detector circuit responds only to AC ring signals, and not to high voltage DC surges, a capacitor 136 is provided in series with line 145 to conduct AC and block DC to the optoisolator diode. The capacitor is selected to withstand a 200-volt DC input without causing illumination of the above diode. An IN4003 silicon diode 138 is connected back-to-back with the optoisolator infrared diode to provide reverse voltage protection when AC ring signals are conducted through the infrared diode.

The infrared diode of optoisolator 140 is optically coupled to a silicon planar NPN photo-Darlington transistor, with the collector brought out to pin 5 and the emitter appearing at pin 4. The 4N33 optoisolator which is described here provides an input to output dielectric isolation of 1500 V. Pin 5 is connected to the regulated 5-volt supply via lines 104 and 148, allowing a logical "1" signal to appear at pin 4 each time the photo-Darlington is biased on by illumination of the coupled infrared diode in response to detection of a telephone line ring signal. A second Darlington transistor 144 is controlled by pin 4 via a bias resistor 142. Transistor 144, which has its collector connected to line 148, amplifies any logical "1" signal appearing at pin 4 and conducts it, via line 150, to the input of a 4584 Schmitt trigger 152. The input of Schmitt trigger 152 is maintained at a quiescent logical "0" by a pull-down resistor 154 which is connected to ground via lines 156 and 106. Schmitt trigger 152 provides snap-action with hysteresis and has its inverted output connected to the trigger of a first timer of a 556 dual timer 158. A timing resistor 160 and capacitor 162 are selected to provide a 2.8-second logical "1" output at pin 5 subsequent to triggering of the timer by Schmitt trigger 152 in response to a detected ring signal. The output of the first timer (pin 5) is, in turn, connected to the trigger (pin 8) of a second timer of dual timer 158 via a noninverted negative edge detector comprising a capacitor 164, a pullup resistor 166, and a 4050 noninverting buffer 168. With this arrangement, the second timer is triggered by the trailing, negative edge of the first timer's output, thereby providing a 2.8-second time delay subsequent to detection of a telephone line ring signal before the second timer is actuated.

Since a telephone ring signal occurs for approximately two seconds and is followed by a 4-second pause before the cycle repeats, the second timer of dual timer 158 is not triggered until slightly after the completion of the first ring signal. As will be later described, the second timer of dual timer 158 actuates the line hold circuit of ring detector and line hold circuit 42, but actuation does not occur until one ring signal has been completed. This provision is included to prevent confusion on the part of a caller attempting to access telephone number coding device 10 which may occur if the device were actuated immediately and before completion of, at least, one ring signal. Of course, the values of either or both timing resistor 160 and capacitor 162 can be changed to cause line hold to occur after any given number of ring signals. One complete ring signal should, however, be sufficient to advise the caller that the device has been correctly accessed by a regular telephone number, and that a required special number code must next be dialed.

The line hold portion of ring detector and line hold circuit 42 consists of the contacts 170 of a sensitive relay comprising line release relay 172, a loading resistor 174, a photo-Darlington optoisolator 176, an interstage audio transformer 178, and a photo SCR optoisolator 180. The above components are series connected across output lines 126 and 122 of first ring silencer 40, and place an associated telephone line in a hold mode when the silicon controlled receifier of photo SCR optoisolator 180 is triggered into conduction by the second timer of dual timer 158 of the ring detector circuit. As previously mentioned, the rectifier comprising first ring silencer 40 also defines polarity for the hold circuit, assuring proper function of the circuit even when telephone line polarity is reversed.

The output of the second timer of dual timer 158 is connected, via a current limiting resistor 182, to the anode (pin 1) of a gallium arsenide infrared emitting diode of an H11C3 photo SCR optoisolator 180. The diode cathode (pin 2) is connected to ground via lines 184 and 106, and is illuminated when the output of the second timer of dual timer 158 is triggered to a logical "1" by the previously described negative edge detector and first timer in response to the completion of a detected ring signal. A timing resistor 186 and capacitor 188 are selected to provide a time delay of approximately 3 seconds. To prevent premature triggering of dual timer 158 when system power is initially turned on via power switch 20, reset pins 4 and 10 are connected to the output of an inverting positive edge detector comprising a capacitor 190, a pull-down resistor 192, and a 4584 Schmitt trigger 194. Capacitor 190 and resistor 192 are chosen to provide a 5-second logical "0" output when switch 20 is initially closed, causing dual timer 158 to be inhibited during power-up glitches. Subsequent to the 5-second time delay, timer reset pins are held at logical "1," allowing the dual timer to operate normally. In addition to controlling the triggering of photo SCR optoisolator 180, the output of the second timer of dual timer 158 is also connected, via line 196, to a logic gate controlling actuation of power relay 50 which will be later described with reference to FIG. 5. Power for dual timer 158 is supplied on lines 104, 148, and 198 (+V) and on lines 106, 156, and 200 (ground).

The infrared diode of photo SCR optoisolator 180 is optically coupled with a light-activated silicon controlled rectifier (LASCR), with the LASCR anode appearing at pin 5, the cathode at pin 4, and the gate at pin 6. The H11C3 photo SCR optoisolator which is described here provides an input to output dielectric isolation of 1500 V. The LASCR anode is connected to the positive output of rectifier 40 on line 126 (corresponding to the telephone line tip wire) via relay contacts 170, loading resistor 174, the infrared emitting diode of optoisolator 176, and the primary coil of audio transformer 178. The LASCR cathode is connected to the negative output of rectifier 40 on line 122 (corresponding to the telephone line ring wire) via a diode string 202. Gate-cathode resistance is provided by a resistor 204 which is connected between line 122 and the LASCR gate (pin 6).

When the infrared diode of optoisolator 180 is illuminated in response to the completion of one telephone line ring signal, the associated LASCR is triggered. Immediately upon triggering, the various resistive elements comprising the hold circuit are operatively switched across lines 122 and 126, thereby loading the telephone line with sufficient resistance to cause the line voltage to drop to a third voltage level (20 V) which, in turn, places the telephone line in a hold mode. Loading resistor 174 is selected to provide sufficient resistance, in series with additional resistance provided by the audio transformer coil and diodes, to load the telephone line with a total resistance which is slightly higher than that provided by a telephone in an off-hook position. Optoisolator 176 is comprised of a 4N33 photo-Darlington optoisolator, identical with that described in the ring detector circuit, and has the anode of its infrared emitting diode connected from pin 1 to loading resistor 174. The diode's cathode is connected from pin 2 to the primary coil of a 1:1 interstage audio transformer 178.

During line hold, the infrared diode of optoisolator 176 is illuminated. The diode is current limited, since its anode is connected in series with loading resistor 174, as above described. Illumination of the diode biases on an associated NPN photo-Darlington transistor which has its collector (pin 5) connected to +V via lines 206 and 104. At this time, a logical "1" signal appears at the Darlington's emitter (pin 4) and is conducted on line 208 to provide a control signal for power relay 50 and a trigger signal for additional timing means which will be described with reference to FIG. 5. A pull-down resistor 209 is connected to ground line 106 to provide line 208 with a quiescent logical "0."

Audio transformer 178 is provided to transfer audio to and from an associated telephone line 36. With the telephone line in a hold mode, any audio present on the line rides atop the nominal 20 V line DC bias and is transferred from the primary to secondary coil of audio transformer 178 which, in turn, is connected, via line 210, to the wiper of SPDT contacts 212 of audio relay 52. In FIG. 4, the relay wiper is shown in its normally closed position, whereby audio consisting of dialed tones or taps of a special number code is conducted to a first amplifier 54 and to a second amplifier 70 (FIG. 6) via a shielded cable 214. Contacts of relay 52 remain in a NC position until a first timer of a dual timer 216 (FIG. 5) is triggered by comparators 60 (FIGS. 7 & 8) in response to a correctly dialed special number code. When this occurs, an NPN relay driver transistor 218 is biased on, via line 220, by a logical "1" voltage which, in turn, energizes the coil of relay 52. The coil of relay 52 is series connected between +V line 148 and the collector of transistor 218 in a common emitter configuration. The emitter of relay driver transistor 218 is connected to system ground via lines 222, 224, and 106.

When a special number code has been correctly dialed, causing relay 52 to be energized, an attenuated, simulated ring tone from a third amplifier 66 (FIG. 5) is conducted, via line 226, relay contacts 212, and line 210, to the secondary coil of audio transformer 178. At this point, the simulated ring tone is transferred onto the telephone line, via the primary coil of audio transformer 178, so the caller knows a special number code has been correctly dialed and the telephone of the device user is "ringing."

When the code device user hears the simulated ring tones reproduced by transducer 68 (FIG. 5) and lifts the handset of his telephone set, telephone number code device 10 is automatically disabled, causing the ring tones to cease. At this point, a fourth telephone line voltage level (5 V) is present, since the nominal resistance of an off-hook telephone instrument is less than the hold resistance placed across the line by loading resistor 174 and other resistive elements of the line hold circuit. The telephone line voltage is, thus, automatically reduced from 20 to 5 volts. Since the holding current provided by a 5-volt telephone line is below that necessary to maintain conduction of the LASCR of optoisolator 180, the LASCR turns off, causing resistor 174, optoisolator 176, and audio transformer 178 to be switched out of circuit. Because power is not supplied to the remainder of the coding device when optoisolator 176 is not actuated, power to third amplifier 66 (FIG. 5) is cut off, causing the simulated ring tones to immediately cease when the handset of an attached telephone 38 is lifted. If an extension telephone, rather than the primary phone, is answered, the resulting drop in telephone line voltage also causes the LASCR to turn off and simulated ring tones to cease.

Selection of the value of gate-cathode resistor 204 for the LASCR of photo SCR optoisolator 180 is done to produce the highest possible minimum holding current for the LASCR while, at the same time, requiring a minimal amount of forward current through an associated infrared diode to optically trigger the LASCR. Since a low-value external gate-cathode resistor increases the minimum holding current to maintain conduction, but also increases the amount of current necessary to trigger the LASCR, the value of resistor 204 must be a compromise. To aid in this compromise, a diode string 202 is provided between the LASCR cathode and ground to add several diode drops to the nominal 5 V off-hook telephone line level. Since each silicon diode causes a voltage drop of approximately 0.5 V, several diodes can be series connected in a string to reduce the nominal 5-volt off-hook voltage to 2 volts or less, and, thus, assure commutation of the LASCR when the primary or extension telephone is lifted off-hook. The exact number of diodes needed in the string depends upon the particular LASCR device being used, since minimum holding current can vary from 0.1 to 0.5 mA, depending on the value of the gate-cathode resistor selected.

Since the DC bias on telephone lines of most telephone systems is momentarily interrupted when a called number is connected to a caller's number, any SCR placed across the phone line will be prematurely turned off. Thus, the LASCR described here is turned off subsequent to triggering by a ring signal and loading of the telephone line to achieve a mold mode. To obviate this, the second timer of dual timer 158 has a timing cycle of approximately 3 seconds, which is long enough to maintain illumination of the infrared diode of optoisolator 180 and, thus, retrigger its associated LASCR immediately following re-establishment of the line DC bias. Following the above 3-second time delay, the LASCR remains latched until anode holding current is reduced below a critical level, as described above.

If a special number code is not dialed correctly (or not known by the caller), the LASCR is also commutated by the momentary opening of normally closed SPST contacts 170 of line release relay 172. The time delay before commutation occurs depends upon the circumstances. If a required special number code is not dialed or dialed incorrectly, the LASCR is turned off within a very short timed interval (20 seconds, for example), and the telephone line is released. If the device user does not answer his telephone within a given number of simulated rings (15 rings, for example), the LASCR is also commutated, and the telephone line is released. Relay 172 is series connected between +V line 104 and the emitter of a PNP relay driver transistor 228. The collector of transistor 228 is connected to line 106, system ground. When transistor 228 is biased on by the presence of a logical "0" signal on line 230, relay contacts 170 open, causing the LASCR to commutate. Line 230 is controlled by either a second timer of dual timer 216 (FIG. 5) which causes line release in 20 seconds, if a special number code is not dialed correctly, or by a first timer of dual timer 216 which causes line release following 15 rings, if the device telephone is not answered. Dual timer 216 will be further described with reference to FIG. 5. It should be noted that lines 122, 126, 145, and 146 of a cooperating telephone line are completely isolated from telephone number coding device 10 because of relay contacts 170, optoisolator 176, audio transformer 178, optoisolator 180, and optoisolator 140.

Figure 5:
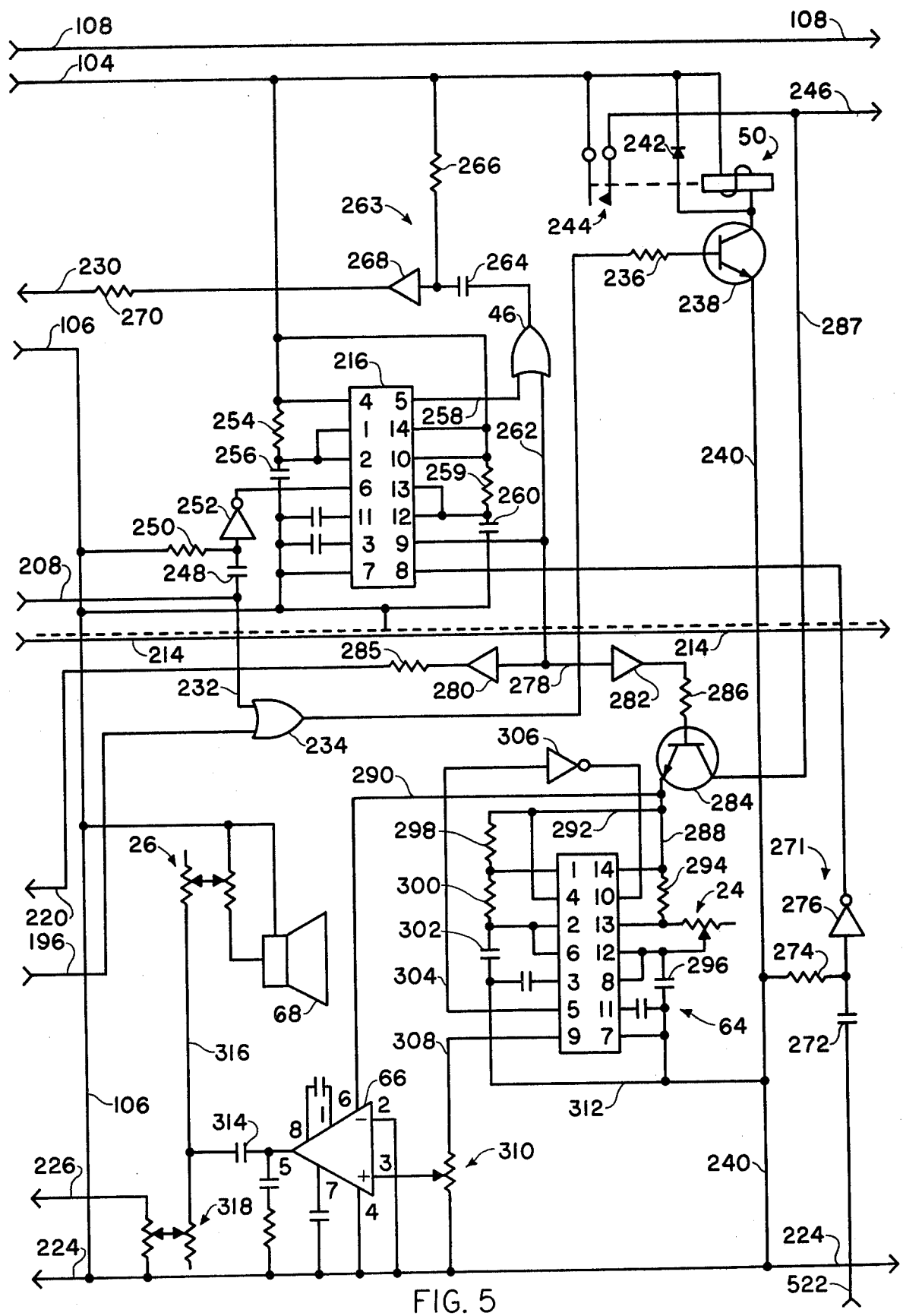
FIG. 5 is a schematic diagram of a power relay, a first timer, second timer, first logic gate, sound generator, third amplifier, and transducer of the present invention.

Referring now to FIG. 5, a power relay, a first timer, a second timer, a first logic gate, a sound generator, a third amplifier, and a transducer are shown in a schematic diagram. As previously described with reference to FIG. 4, photo-Darlington optoisolator 176 produces a logical "1" output on line 208 when an associated telephone line is placed in a hold mode in response to a detected ring signal. The logical "1" output is conducted on line 208 and line 232 to a first input of a 4071 2-input OR gate 234. The output of OR gate 234 is connected, via a bias resistor 236, to the base of an NPN relay driver transistor 238 which, in turn, energizes power relay 50 in response to the presence of the above logical "1" output. The coil of relay 50 is connected between power supply +V line 104 and the collector of driver transistor 238. Since the emitter of transistor 238 is connected, via line 240, to ground line 224, the coil of relay 50 is energized each time transistor 238 is biased on by OR gate 234. To protect the relay driver transistor from inductive voltage spikes, a silicon diode 242 is connected across the relay coil. Similar protection diodes are used with relays 52 and 172.

The wiper contact of normally open SPST contacts 244 of power relay 50 is connected to power supply line 104, and conducts +V on line 246 to the remainder of the coding device circuit via a fixed relay contact when power relay 50 is energized. Thus, all components of telephone number coding device 10 receive power when a logical "1" output appears on line 208 in response to ring detector and line hold circuit 42 (FIG. 4). As previously described, a momentary telephone line DC bias dropout can occur when line hold occurs. To prevent this dropout from occuring on +V line 246, the 3-second logical "1" output of the second timer of dual timer 158 (FIG. 4) is also conducted on line 196 to a second input of OR gate 234, and maintains constant actuation of relay 50 during the dropout.

Again referring to FIG. 5, line 208 also conducts any logical "1" output to an inverting positive edge detector comprising a capacitor 248, a pull-down resistor 250, and a 4584 Schmitt trigger 252. The edge detector responds to line 208 going high when the telephone line is seized and held in response to a detected ring signal, and produces a brief negative output pulse which is conducted to the trigger (pin 6) of a second timer 44 of a 556 dual timer 216. A timing resistor 254 and capacitor 256 are selected to give second timer 44 a time delay of 20 seconds. The output of second timer 44 appears at pin 5 and is conducted on line 258 to a first input of a 4071 2-input OR gate comprising a first logic gate 46.

A first timer 62 of dual timer 216 has a 90-second time delay provided by a timing resistor 259 and capacitor 260. The output of first timer 62 appears at pin 9 and is conducted on line 262 to a second input of OR gate 46. The output of OR gate 46 is connected to the input of a noninverting negative edge detector 263 comprising a capacitor 264, a pull-up resistor 266, and a 4050 buffer 268. The detector output provides a brief negative pulse in response to either a first or second timer of dual timer 216 going low at the end of a timing cycle. The output of the negative edge detector is conducted, via a bias resistor 270, on line 230 and energizes line release relay 172 (FIG. 4), causing automatic line release following either a 20-second or 90-second time delay. First timer 62 of dual timer 216 is triggered, via an inverting positive edge detector 271 comprising a capacitor 272, a pull-down resistor 274, and a 4049 inverting buffer 276, by comparators 60 (FIGS. 7 & 8) when a caller has correctly dialed a required special number code. When this occurs, OR gate 46 transmits a logical "0" subsequent to a 90-second time delay. The previously described negative edge detector 263, in turn, produces a brief low output on line 230 which energizes relay 172 (FIG. 4) and releases the telephone line. The purpose of the above circuit is to cause automatic line release (hang up) subsequent to 15 simulated rings when a caller has correctly dialed a special number code, and when the device user fails to answer his telephone.

If a special number code has not been correctly dialed by a caller, the second timer of dual timer 216 causes automatic line release subsequent to a 20-second time delay, since the previously described first timer will not be triggered by comparators 60 and both inputs of first logic gate 46 will be low at the end of the time delay. When a special number code is correctly dialed within the above 20-second time delay, the second timer does not cause line release following a 20-second delay because the comparators 60 will have triggered the first timer. At this point, the first and second inputs of OR gate 46 are logical "0" and "1" respectively, and line release occurs subsequent to a 90-second time delay of the first timer of dual timer 216 when both inputs of OR gate 46 are logical "0."

To summarize: telephone number coding device 10 automatically releases an associated telephone line from a hold mode (1) when an associated primary or extension telephone receiver is lifted by the device user in response to hearing simulated ring tones, (2) following a 20-second time delay, when a caller does not correctly dial a required special number code, and (3) following a 90-second time delay when the device user fails to answer his telephone in response to approximately 15 simulated ring tones. Of course, the above time delays can be altered, since the times designated are merely used as examples.

When the first timer of dual timer 216 is triggered via comparators 60 in response to a correct special number code, a logical "1" output on line 262 is also conducted to line 278 and, consequently, to 4050 noninverting buffers 280 and 282. At this point, NPN transistors 218 (FIG. 4) and 284 are actuated via bias resistors 285 and 286. Relay driver transistor 218 energizes audio relay 52 which, in turn, connects line 210 with line 226. With relay contacts 212 in an energized position, audio on line 226 is transferred onto an associated telephone line via the secondary and primary coils of audio transformer 178. Switching transistor 284 (FIG. 5) is conducting, as above described, and provides +V, via lines 246 and 287, to lines 288, 290, and 292 which are connected to the transistor's emitter. These lines, in turn, power sound generator 64 and third amplifier 66 to produce simulated ring tones until the device user answers his telephone, or for approximately 15 rings (90 seconds) if the device telephone is not answered.

Sound generator 64 is comprised of a 556 dual timer which operates in an astable mode. A first astable multivibrator generates simulated ring tones for the telephone number coding device, and can be adjusted by an external variable resistor 24 to provide any frequency between 200 Hz and 2 kHz. As shown in FIG. 1, the control for variable resistor 24 is positioned on the face of the coding device housing 12, so the user can adjust the ring tone frequency (pitch) to suit himself. The astable's charging time is determined by a fixed resistor 294 and variable resistor 24 in series with a capacitor 296. Discharging time is determined by capacitor 296 and variable resistor 24.

To provide a repetitive, 2-second simulated ring tone followed by a 4-second pause, which simulates normal telephone rings, a second timer of dual timer 64 is also used as an astable multivibrator controlling the output of the first astable. Resistors 298 and 300 and a capacitor 302 are selected to provide a 0.166 Hz output which has a 50% duty cycle. Thus, the output cycle at pin 5 is positive for 4 seconds and negative for 2 seconds. The output is conducted on line 304, via a 4049 inverter 306, to the reset input (pin 10) of the first astable. Since reset input pin 10 must be positive for the first astable to produce a tone output, the inclusion of inverter 306 causes a repetitive ring tone of 2 seconds followed by a 4-second pause. The sound generator output appears at pin 9 and is conducted on line 308 to a potentiometer 310 of third amplifier 66. Sound generator 64 and third amplifier 66 receive ground via lines 106, 224, 240, and 312.

The wiper of potentiometer 310 is connected to the noninverting input (pin 3) of a 386 linear low voltage audio amplifier which serves as third amplifier 66. The unused, inverting input (pin 2) is shorted to ground. Pin 4 is connected to system ground via line 224. The amplifier is bypassed to ground via a small capacitor between pin 7 and line 224. Supply +V is conducted to pin 6 of the amplifier via line 290. A capacitor is connected between pins 1 and 8 to set amplifier gain, and a capacitor and resistor are series connected between the output (pin 5) and ground to suppress RF oscillation which can occur during the negative swing of an amplified audio signal. The output of third amplifier 66 is coupled, via a capacitor 314, to an output bus 316 which, in turn, conducts simulated ring tones to two ganged, variable resistors comprising an L-pad 26 which provides an adjustable volume control for the ring tones. As previously described, volume control 26 is positioned on the face of coding device housing 12 (FIG. 1), allowing the device user to adjust ring tone volume to any desired level. The output of volume control 26 is connected to the positive terminal of a transducer 68 which is mounted inside device housing 12 directly below speaker grille 14 (FIG. 1).

Ring tone output bus 316 also conducts amplified ring tones to a second L-pad 318 which is grounded via line 224. The output of L-pad 318 is connected to line 226 which, as previously described with reference to FIG. 4, conducts simulated ring tones to aduio relay 52. L-pad 318 is adjusted to attenuate the simulated ring tones, so they will be of low volume when transferred onto a telephone line 36 which is connected to the coding device.

Figure 6:
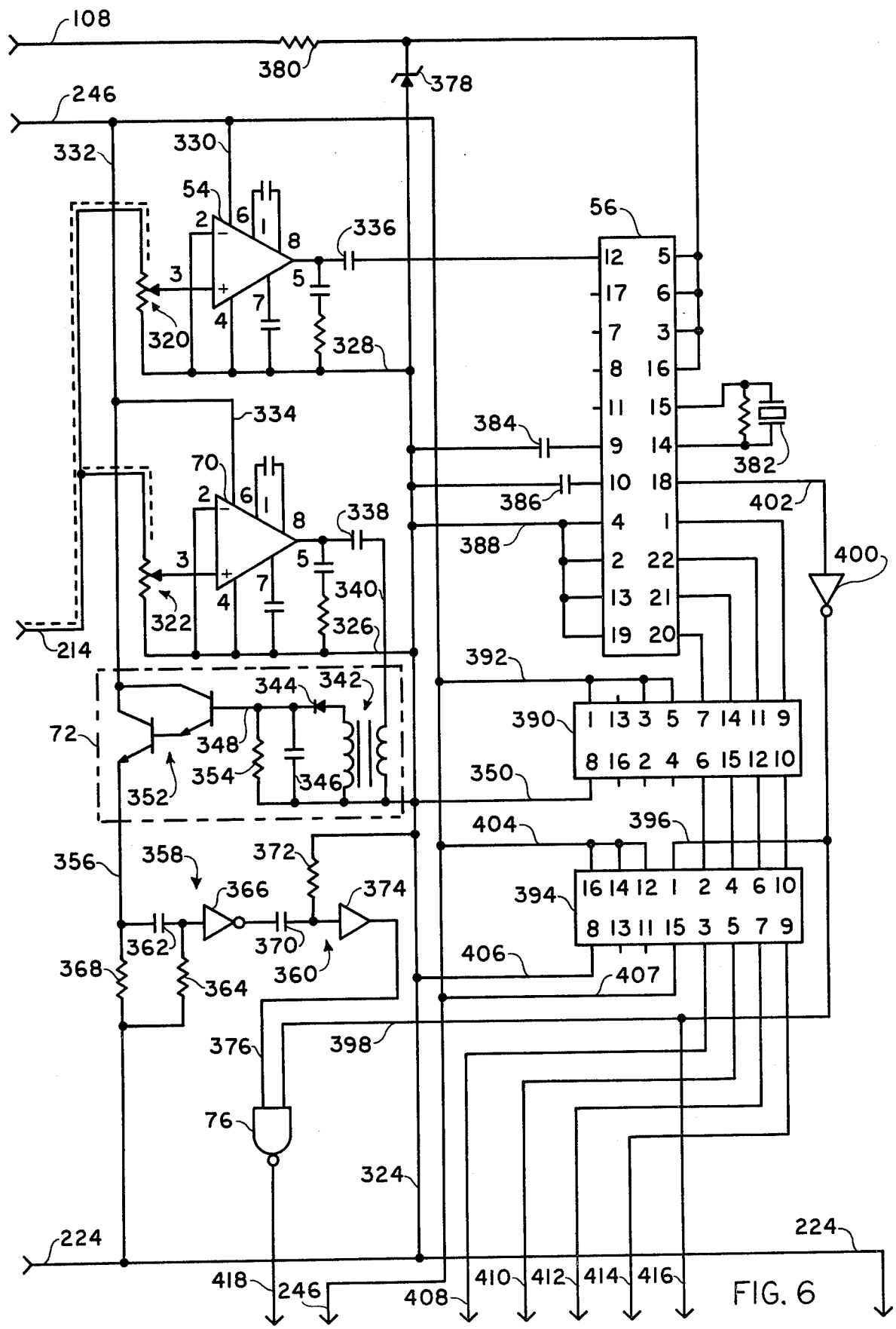
FIG. 6 is a schematic diagram of a first amplifier, second amplifier, tap detector, propagation delay circuit, DTMF receiver, voltage translator, tri-state buffers, and a second logic gate of the present invention.

Referring next to FIG. 6, a first amplifier, second amplifier, tap detector, propagation delay circuit, DTMF receiver, voltage translator, tristate buffers, and a second logic gate are shown in a schematic diagram. With the contacts of audio relay 52 (FIG. 4) in a normally closed position and optoisolator 180 conducting subsequent to receipt of a ring signal, any tones or taps produced by a caller are conducted, via shielded line 214, to a first amplifier 54 and to a second amplifier 70. Separate amplifiers are provided because the audio signal required for a DTMF receiver 56 is considerably less than that required for a tap detector 72. Each amplifier input level is optimally adjusted by a potentiometer 320 of amplifier 54 and by a potentiometer 322 of amplifier 70. The wiper of each potentiometer is connected to the noninverting input (pin 3) of a 386 low voltage power amplifier 54 and 70. The unused, inverting input (pin 2) is shorted to ground. Pins 4 are connected to system ground via lines 224, 324, 326, and 328. Both amplifiers are bypassed to ground via a small capacitor between pins 7 and lines 326 and 328. Supply +V is conducted to pin 6 of each amplifier via lines 246, 330, 332, and 334. Capacitors are connected between pins 1 and 8 to determine amplifier gain, and a capacitor and resistor are series connected between amplifier outputs (at pin 5) and ground to suppress RF oscillation which can occur during the negative swing of an amplified audio signal. The output of first amplifier 54 is coupled with a DTMF receiver 56 via a capacitor 336; the output of second amplifier 70 is coupled with a tap detector circuit 72 via a capacitor 338.

The output of second amplifier 70 is conducted, via line 340, to the 8-ohm coil of a reversed audio output transformer 342. A silicon diode 344 rectifies the amplified tap signal which has been transferred to the 1 k-ohm coil of transformer 342, and is, in turn, filtered by a capacitor 346 which is connected between positive line 348 and ground line 350. The rectified and filtered tap signal is then conducted, via line 348, to the base of an NPN Darlington transistor 352. To assure rapid switching response of the Darlington transistor, a pull-down resistor 354 is connected between lines 348 and 350. The collector of transistor 352 is connected, via line 332, to +V line 246, providing a logical "1" output on emitter line 356 each time the transistor is biased on by an amplified tap signal.

To provide a propagation delay of approximately 35 milliseconds, the tap detector output on line 356 is conducted through an inverting positive edge detector 358 and a noninverting positive edge detector 360. Inverting positive edge detector 358 comprises a capacitor 362, a pull-down resistor 364, and a 4584 inverting Schmitt trigger 366. A Schmitt trigger is used to provide a snap-action response with hysteresis, and a pull-down resistor 368 is included to provide the detector input with a quiescent logical "0" when no tap signal is being detected.

Noninverting positive edge detector 360 is comprised of a capacitor 370, a pull-down resistor 372, and a 4050 noninverting buffer 374. When a logical "1" tap signal occurs on line 356, detector 358 generates a negative pulse of approximately 35 mS in duration. The resulting trailing positive edge of the pulse, in turn, causes detector 360 to generate a brief 10 mS logical "1" pulse. This pulse appears on line 376 which is connected to a first input of a 4011 2-input NAND gate which comprises a second logic gate 76. Because of the propagation delay circuit, a detected tap signal does not appear at the first input of logic gate 76 until 35 mS after the signal has been detected. The purpose of the above propagation delay circuit will be later described with reference to DTMF receiver 56 which is also shown in FIG. 6.

The output of first amplifier 54 is AC coupled, via capacitor 336, with the "analog in" input (pin 12) of a 3201 integrated dual tone multi-frequency (DTMF)

receiver which is manufactured by ITT. The analog input, consisting of amplified DTMF tones produced by a caller attempting to access the telephone number coding device, is pre-processed by 60 Hz reject and band splitting filters. Subsequently, any of the standard telephone dialing tone pairs of 697, 770, 852, 941, 1209, 1336, and 1477 Hz are detected by integrated bandpass filters and, finally, binary coded from a 2-of-8 format. Although the receiver will also detect and decode a 1633 Hz tone, this tone is not normally used in telephone dialing. Thus, the "IN1633" pin (pin 5) is tied high to inhibit detection of a 1633 Hz tone. The four binary coded outputs, D1, D2, D4, and D8, appear at pins 1, 22, 21, and 20, respectively, so that detection of a valid tone pair comprising 697 Hz and 1209 Hz representing the digit "1" results in a binary coding of "0001;" detection of the tone pair comprising 697 Hz and 1336 Hz representing the digit "2" are coded as "0010, " etc.

DTMF receiver 56 receives +V via line 108 and power supply pin 6. Since the 3201 receiver requires a 12-volt supply, +V line 108 is connected between bridge rectifier 94 and voltage regulator 98 (FIG. 4), and is regulated at 12 volts by a 12-volt Zener diode 378. A current limiting resistor 380 is provided to hold current consumption to about 50 mA. A 3.579545 MHz crystal 382 is connected between pins 14 and 15 to provide a frequency reference for the receiver chip. Pins 9 and 10 are bypassed to ground via capacitors 384 and 386. Pins 3 and 16 are tied high to enable the data outputs and crystal oscillator, respectively. The receiver receives ground via lines 224, 324, and 388 and pins 4 and 13. Pin 2 is tied low to select a binary coded 2-of-8 data output; pin 19 is tied low to enable a data valid strobe at pin 18, which goes high when a valid tone pair is detected and decoded at output pins D1, D2, D4, and D8 (pins 1, 22, 21, and 20).

Since the data outputs from receiver 56 are at 12 volts, they are connected to the buffer inputs of a 4050 hex noninverting buffer/voltage translator 390. The buffers receive +V via lines 246 and 392 and pin 1. Since the voltage at pin 1 sets the voltage swing at all of the buffer outputs, and, since lines 246 and 392 conduct system +V at 5 volts, the buffer outputs are translated from 12 to 5 volts and are compatible with other system inputs. Buffer inputs at pins 3 and 5 are tied high because these buffers are not used. The 4050 receives ground via lines 224, 324, and 350. The buffer/translator outputs appear on pins 6, 15, 12, and 10 which, in turn, are connected to buffer input pins 2, 4, 6, and 10 of a 4503 noninverting tri-state buffer 394. The four buffers which are used are controlled by an enable input at pin 1 which is connected, via lines 396 and 398, a 4049 inverter 400, and line 402, to the "data valid" strobe of DTMF receiver 56. When decoded DTMF tones are present at the receiver outputs, the tri-state enable (pin 1) is low, causing the data inputs at pins 2, 4, 6, and 10 to be present at pins 3, 5, 7, and 9 of tri-state buffer 394. When no decoded DTMF tones are present, the tri-state outputs float as open circuits and are connected to a data bus which will be described with reference to FIG. 7. The tri-state buffer receives +V via lines 246 and 404 and pin 16. Unused buffer inputs at pins 12 and 14 are tied high via line 404. The 4503 receives ground via lines 224, 324, and 406, and pin 8. The unused enable at pin 15 is wired positive via line 407. All data outputs from DTMF receiver 56 are, thus, translated from 12 to 5 volts and tri-stated as they appear at pins 3, 5, 7, and 9 and on associated lines 408, 410, 412, and 414. The inverted DTMF strobe output appearing on line 398 is also connected to a second input of second logic gate 76 and to line 416. The logical "0" strobe pulse appearing on line 416 is used to clock a memory 58, and will be later described with reference to FIG. 7.

Any logical "1" tap signal appearing on line 376 is gated by second logic gate 76 to eliminate spurious tap signals, since both taps and DTMF tones are amplified by second amplifier 70 and detected by tap detector circuit 72. Since inverted DTMF strobe line 398 and associated second input of NAND gate 76 are low whenever DTMF tones are being received, the NAND gate transmits a logical "0" output only when a tap signal on line 376 is valid, i.e., when line 376 is high in response to a tap signal and line 398 is also high in response to the absence of DTMF tones. To assure a handshake between the tap and DTMF inputs of second logic (NAND) gate 76 before an output is transmitted, the tap signal on line 376 is delayed for 35 mS by a propagation delay circuit, as above described.

A propagation delay of 35 mS is selected because it allows enough time for second logic gate 76 to verify the absence of DTMF tones before an output is transmitted on line 418, yet the delay is short enough to effectively inhibit the gate output within the minimum, 40 mS pulse width required for the transmission of DTMF tones. Thus, the propagation delay is short enough to verify the presence of very rapid DTMF tones which can be generated at a rate of 10 to 12 tone pairs per second by an automatic dialing device. If the propagation delay is too short or long, the handshake between tap and tone circuits is lost, causing DTMF tones to trigger a missing pulse detector (to be subsequently described with reference to FIG. 8) which, in turn, causes spurious clocking of memory 58 during detection of DTMF tones. The propagation delay circuit and logic gate could, of course, be replaced by a low pass audio filter at the input of second amplifier 70 to separate taps from DTMF tones, but the above digital circuits are desirable, since analog filtering is already accomplished by DTMF receiver 56.

Figure 7:
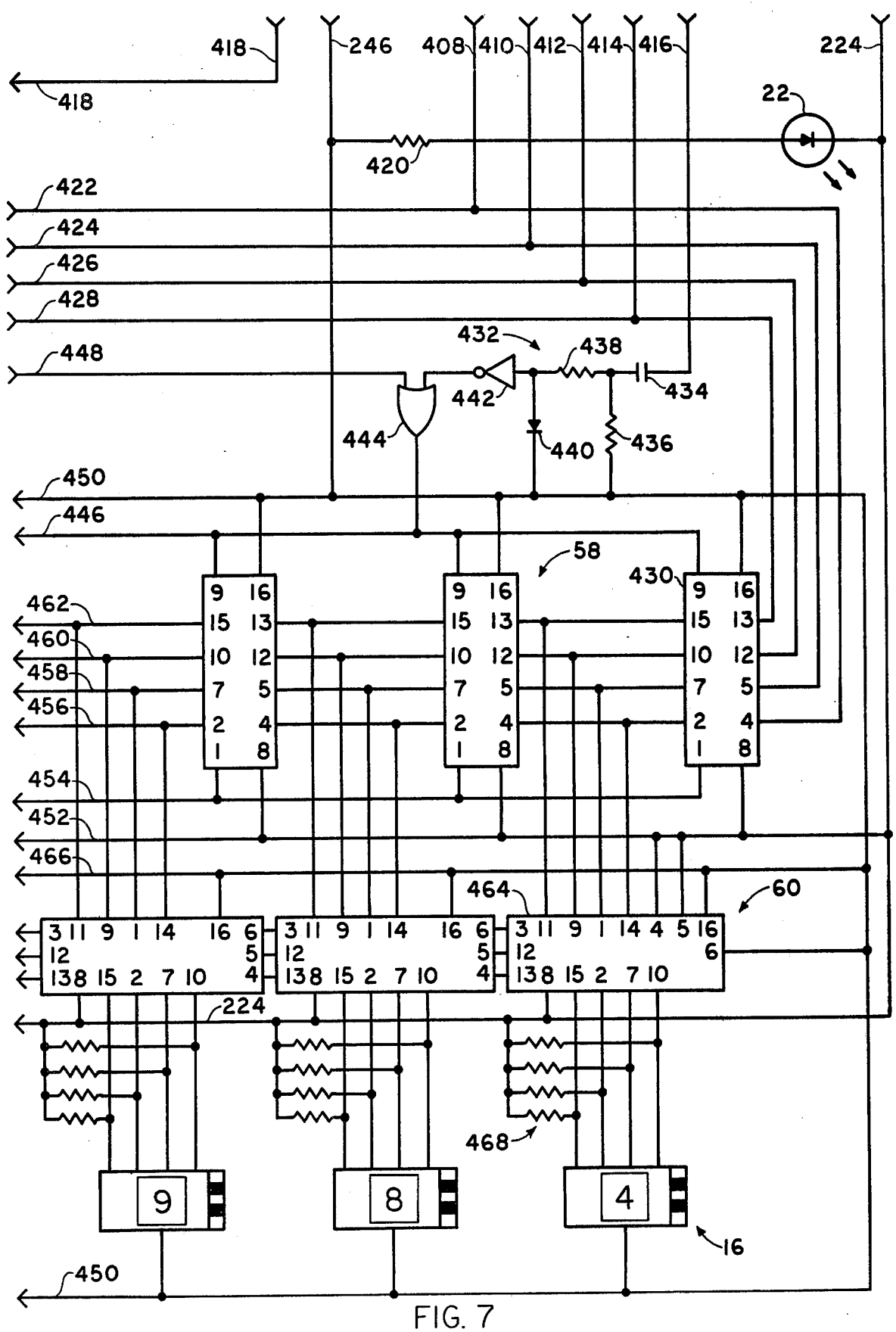
FIG. 7 is a schematic diagram of a line hold indicator, a portion of the member clocking circuit, memory, associated comparators, and thumbwheel switches of the present invention.

Referring next to FIG. 7, a line hold indicator, a portion of the memory clocking circuit, memory, associated comparators, and thumbwheel switches are shown in a schematic diagram. A line hold indicator light-emitting diode (LED) 22 is connected between +V line 246 and ground line 224 via a current limiting resistor 420 which holds the LED current to approximately 10 mA. Since +V line 246 is energized only when the contacts 244 of power relay 50 (FIG. 5) are closed during the line hold mode, LED 22 is illuminated whenever a call is received by coding device 10. As previously described with reference to FIG. 1, the line hold indicator is mounted on the face of the coding device, and provides visual indication of any call which is received. If a special number code is not dialed, or dialed incorrectly, the LED glows for 20 seconds until automatic line release occurs; if a special number code is dialed correctly, the indicator glows until the call is answered, or until automatic line release occurs after completion of 15 simulated ring tones.

The binary coded DTMF tones from tri-state buffers 394 (FIG. 6) are conducted on lines 408, 410, 412, and 414 which, in turn, are connected to lines 422, 424, 426, and 428. These latter lines are connected to the data inputs (pins 4, 5, 12, and 13) of a 74C175 quad D flip-flop 430, and conduct binary data from either DTMF receiver 56 (FIG. 6) or a tap counter 74 which will be later described with reference to FIG. 8. Since lines 408, 410, 412, and 414 are open-circuited when tri-state buffer 394 is not enabled by the presence of DTMF tones, the above data lines are used to bus binary data from both sources. D flip-flop 430 is the least significant stage of four flip-flops which comprise memory 58. The "Q" outputs (pins 2, 7, 10, and 15) of each flip-flop are connected to the data inputs of each succeeding flip-flop, allowing data presented to flip-flop 430 to be temporarily stored and subsequently shifted to the next significant flip-flop as new binary coded digits are received.

The inverted strobe output is connected, via line 416, to an inverting negative edge detector 432 comprising a capacitor 434, a pull-up resistor 436, a series resistor 438, a diode 440, and a 4049 inverter 442. Series resistor 438 and diode 440 are included in detector circuit 432 to improve the input waveform and to shorten recovery time. When DTMF strobe line 416 drops to logical "0" in response to DTMF binary data, inverting detector 432 outputs a brief positive pulse. The output of detector 432 is connected to a first input of a 4071 2-input OR gate 444 which, in turn, has its output connected to a clock bus 446. Bus 446 conducts a positive edge to each clock input (pin 9) of the memory flip-flops, causing the flip-flops to be simultaneously clocked each time strobe line 416 goes low in response to new 4-bit data presented on bus lines 422, 424, 426, and 428. Line 448 is connected to a second input of OR gate 444, allowing memory 58 to also be clocked in conjunction with a tap counter 74 (FIG. 8).

Pin 16 of each of the memory flip-flops receives +V via lines 246 and 450; pin 8 of each flip-flop receives ground via lines 224 and 452. Each time the memory flip-flops are powered up by power relay 50 (FIG. 5) in response to a received telephone call, an automatic power-on reset circuit shown in FIG. 8 generates a brief logical "0" pulse on line 454 to pin 1 of each flip-flop, forcing all memory outputs to a zero state. All memory input-output lines, such as lines 456, 458, 460, and 462, are connected to a first set of comparator inputs (pins 14, 1, 9, and 11) of 74C85 4-bit magnitude comparators 60. A second set of comparator inputs (pins 10, 7, 2, and 15) are connected to the BCD outputs of thumbwheel switches 16. Comparator 464 is the least significant stage of four cascaded comparators which comprise comparators 60. Since four digits are used in the preferred embodiment as a special number code, the four comparators are cascaded to compare four digits, which are dialed by a caller, with four preselected digits which are determined by the position of thumbwheel switches 16. The A=B input (pin 6) of comparator 464 is connected to +V via line 450, and the A>B and A<B inputs (pins 4 and 5) are connected to ground via lines 224 and 452. The cascading outputs (pins 3, 12, and 13) of comparator 464 are connected to the respective cascade inputs (pins 4, 5, and 6) of the next significant stage, and so on. The comparators receive +V at pin 16 on lines 450 and 466 and ground at pin 8 on line 224.

Each of the thumbwheel switches 16 receives +V on line 450 and outputs a 4-bit, BCD code for any digit ("0" through "9") which is selected by rotation of the switch. As previously described, the switch outputs are connected to a second set of comparator inputs, allowing a preselected 4-digit thumbwheel switch code to be compared with a 4-digit special number code which is dialed into memory 58. Pull-down resistors 468 provide logical zeros on the thumbwheel switch outputs.

Figure 8:
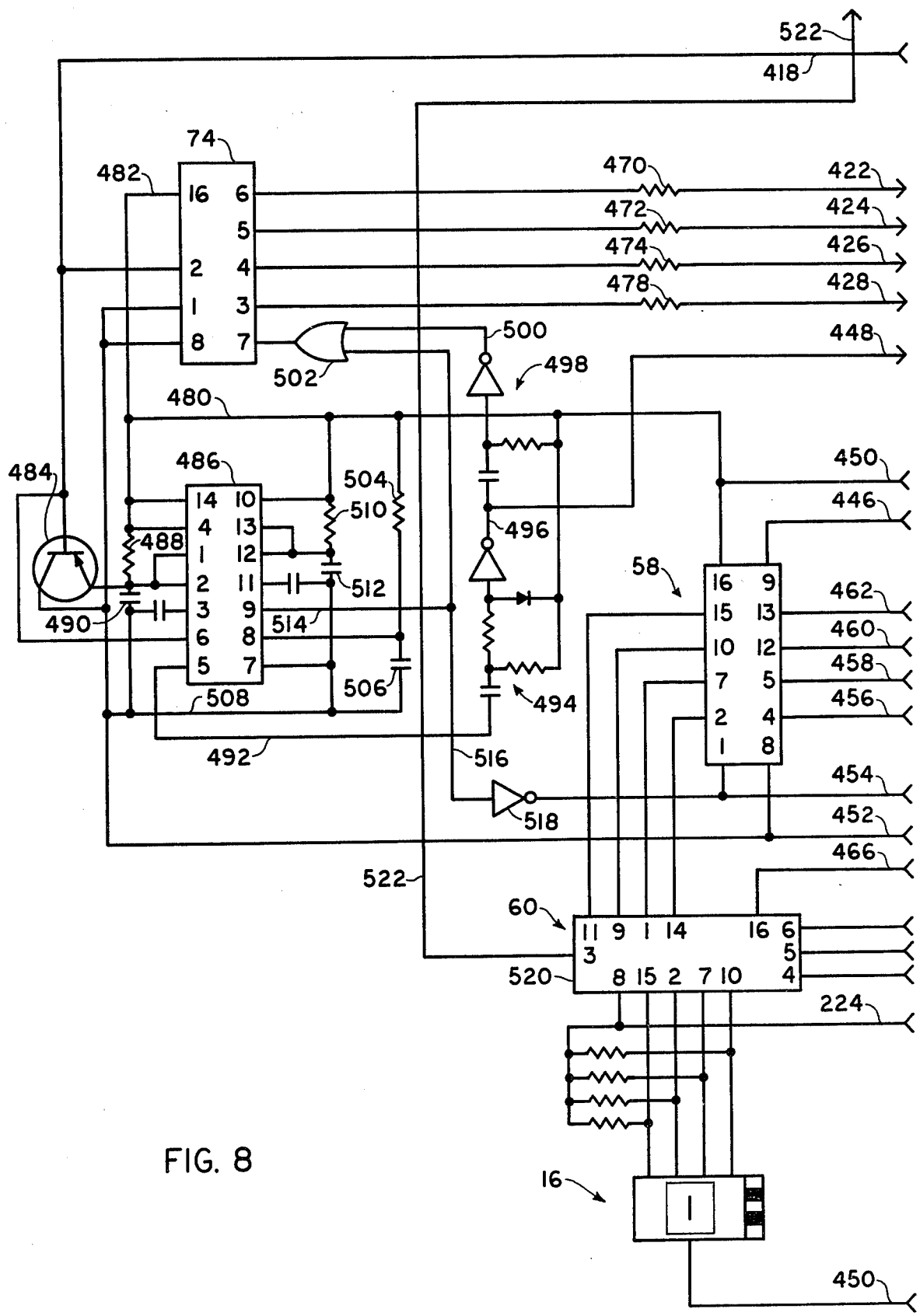
FIG. 8 is a schematic diagram of a portion of the memory clocking circuit, memory, associated comparators, and thumbwheel switches, as well as a tap counter, missing pulse detector, and power-on reset timer of the present invention.

Referring now to FIG. 8, a portion of the memory clocking circuit, memory, associated comparators, and thumbwheel switches, as well as a tap counter, missing pulse detector, and power-on reset timer are shown in a schematic diagram. As previously described with reference to FIG. 6, a logical "0" tap signal is transmitted by second logic gate 76 on line 418. Line 418 is connected to the enable input (pin 2) of a 4518 synchronous BCD counter comprising tap counter 74. The counter clock input (pin 1) and ground input (pin 8) are grounded via line 452, allowing the counter to advance one count on each negative edge transition of line 418. Thus, counter 74 is negative edge clocking, rather than the usual positive edge clocking, and, therefore, counts only the valid logical "0" signals which are conducted on line 418 from second logic gate 76. The resulting 4-bit, BCD count is then conducted, via series resistors 470, 472, 474, and 478 and lines 422, 424, 426, and 428, to the data inputs of flip-flop 430 of memory 58 (FIG. 7). Data from tap counter 74 controls the memory inputs, unless tri-state buffers 394 (FIG. 6) are enabled by encoded DTMF signals. When this does occur, DTMF data swamps series resistors 470, 472, 474, and 478 and takes control of the memory data bus lines. Tap counter 74 receives +V at pin 16 via lines 450, 480, and 482.

Second logic gate output line 418 is also connected to the base of a PNP transistor 484 and the trigger input (pin 6) of a first timer of a 556 linear dual timer 486. The external transistor provides a negative-recovery circuit which allows the first timer to function as a missing pulse detector. A timing resistor 488 and a timing capacitor 490 provide a 500 mS time delay, thus maintaining a logical "1" output on pin 5 and line 492 as long as tap signals arrive at the timer trigger within 0.5 second. Timer output line 492 is, in turn, connected to an inverting negative edge detector 494, allowing the detector to generate a brief positive pulse whenever a missing pulse occurs, i.e., when a successive tap signal fails to arrive within the predetermined 0.5-second time delay, thereby causing the trailing negative edge of the timer output to actuate inverting negative edge detector 494. The output of detector 494 appears on line 496 which, in turn, is connected to line 448. As described with reference to FIG. 7, line 448 is connected to a second input of OR gate 444, which clocks memory 58 with a positive-going pulse. Thus, memory 58 is closed each time a 0.5-second or longer pause occurs between tap signals, causing the resulting tap count from tap counter 74 to be retained by the "Q" outputs of flip-flop 430 (FIG. 7). For example, when the digit "9" is "dialed" using the tap method, tap counter 74 counts the nine taps as they occur and presents the total in binary code to the memory inputs. The tap total ("9," or BCD "1001") is clocked into flip-flop 430 only when the caller pauses for 0.5 seconds or longer between digits. As previously described, the caller is instructed to tap distinctly, but rapidly, for each digit and to pause for a half-second or more between digits.

Output line 496 of inverting negative edge detector 494 is also connected to a second inverting negative edge detector 498. Subsequent to clocking of memory 58 by the leading positive edge of the output of detector 496, the trailing negative edge triggers detector 498. The output of detector 498 is connected, via line 500, to a first input of a 4071 2-input OR gate 502 which, in turn, transmits a brief positive output to the reset input (pin 7) of tap counter 74. Thus, tap counter 74 is reset to zero following each interdigital pause of 0.5 second or more and clocking of memory 58 in preparation for a new tap count of a succeeding digit. Except for a brief logical "1" reset pulse occuring subsequent to memory clocking and power-up, reset pin 7 of the tap counter remains low.

A second timer of dual timer 486 provides an automatic power-on reset circuit for memory 58 and tap counter 74. A pull-up resistor 504 connected to +V line 480 and a capacitor 506 connected to ground lines 508 and 452 form a negative edge detector which triggers the reset timer, via pin 8, each time power relay 50 (FIG. 5) is energized in response to a received telephone call. A timing resistor 510 and a timing capacitor 512 determine a 1-second time delay when the above reset timer is triggered. The reset output appears on pin 9, and is conducted, via line 514 and line 516, to a second input of OR gate 502 and to the input of a 4049 inverter 518. The output of inverter 518 is connected to a reset bus 454 which clears all memory flip-flop outputs to zero when power is initially applied to the memory. As previously described, OR gate 502 is connected to the tap counter reset input, causing the counter to also be reset to zero during initial power application. The above circuit eliminates spurious outputs due to power-up glitches, and remains active long enough for the supply voltage to stabilize.

FIG. 8 also shows the most significant D flip-flop of memory 58, the most significant comparator stage of comparators 60, and the most significant thumbwheel switch of thumbwheel switches 16. Using a previous example, a special number code consisting of the digits "1984" has been selected by rotation of the thumbwheel switches. Once a caller has dialed the regular telephone number of a device user, he then must dial "1984" in order to actuate the device's simulated ring tone circuit. As each digit is dialed, using either DTMF tones or taps, it is clocked into least significant memory flip-flop 430 (FIG. 7), and shifted to the next significant stage until each memory flip-flop contains one of the four digits. As will be noted, memory 58 constitutes a 4-stage, parallel-in/parallel-out shift register. If the special number code has been dialed correctly, the A=B output (pin 3) of comparator 520 immediately goes high and conducts a logical "1" voltage on line 522 to inverting positive edge detector 271 (FIG. 5) which is connected to the trigger of first timer 62 of dual timer 216. As previously described, once the first timer is triggered, a sound generator 64 is actuated, producing simulated ring tones via transducer 68.

To simplify the foregoing schematic diagrams, power supply lines for the various individual gates, inverters and buffers are not shown. Because of this, associated power supply bypass capacitors are also not shown, although several are required. Although the coding device described here utilizes an ITT 3201 DTMF receiver, any of several similar receivers can be substituted, such as the ITT 3210 DTMF receiver, the General Instrument AY-5-9801 DTMF receiver, and the Mostek MK5102 integrated tone receiver. Some DTMF receivers do, however, require additional external components, such as high and low band filters. The various discrete components of the telephone number coding device described here can, of course, be reduced in number by the utilization of a microprocessor chip.

Although the coding device uses a 4-digit special number code, a longer or shorter code can be used. A code consisting of additional digits would, of course, require addition of extra memory and comparator stages, as well as additional thumbwheel switches. A 4-digit code should, however, offer sufficient security, since a caller has only one chance in 9,999 of guessing the correct code. Since the device memory is automatically reset to zero each time a call is received, a one, two, or three-digit code can be used without any additions, as long as the device user correctly sets the thumbwheel switches. If a "23" (2-digit) code is used, for example, the thumbwheel switches must be set to "0023."

It would be desirable to utilize the tap detector and tap counter circuits of the coding device to detect and count rotary dial outpulses, rather than taps, so a caller using a rotary or pushbutton telephone could actually dial a required special number code, rather than using a pen or pencil to tap out the code. But, once a regular number has been dialed and the connection made, additional pulsing of the telephone line with a rotary or pushbutton dial often causes a disconnect. Any caller having a non-tone telephone and who does not wish to tap special codes can, of course, purchase a tone telephone, if his telephone company offers tone service, or he can purchase a DTMF generator accessory, such as Buscom Systems' "Soft-Touch." In areas where tone service is not available, the caller can dial a regular telephone number using his rotary telephone, and then dial a special number code using the "Soft-Touch" accessory. Tapping a special number code with a pen or pencil is not difficult, however, and can be done nearly as easily and rapidly as one can dial a rotary telephone. Coding device users will probably wish to avoid using zeros in their codes, since ten taps are required to "dial" each zero.

Since the telephone number coding device utilizes its own simulated ring tone generator to alert the device user of a valid incoming call, the sound generator described in FIG. 5 can be replaced by any of several integrated circuit music synthesizer chips to generate a musical tune instead of "rings." An addition of a read-only memory (ROM) or a programmable, read-only memory (PROM) would allow the device user to select a desired tune from several tunes, or allow him to program a tune of his own composition. If the telephone number coding device is used in a large building, remote speakers can be wired to the primary speaker contained within the device housing to assure that ring tones are easily heard for all incoming calls. As previously described, any extension telephone can be used with a telephone connected to the coding device, but the ring mechanism of each extension phone should be silenced by a ring silencer device, such as illustrated in FIG. 2.

Additional integrated circuits can be added to provide synthetic speech so the coding device can, for example, instruct the caller to dial a special number code subsequent to the answering of his call. If the special number code is incorrectly dialed within a predetermined time interval, the speech synthesizer can so inform the caller prior to automatic line release. Or, the synthesizer can inform the caller: "Your party doesn't answer," if the device phone is not answered following a number of simulated rings.

The terms and expressions which have been employed in the foregoing drawings, abstract, and specification are used therein as terms of description and not of limitation; it being understood that changes may be made in the embodiment disclosed without departing from the spirit and scope of the invention as defined in the following claims.

What is claimed is:

1. A telephone number coding device for eliminating unwanted telephone calls, intended to be connected between a telephone line and a telephone set, said coding device comprising in combination: a first ringer silencing means connected in series between said telephone line and telephone set for silencing a ringer mechanism of said telephone set; ring detector means connected in parallel with said telephone line, and line hold means connected in parallel with said telephone set, said ring detector means actuating said line hold means in response to ring signals appearing on said telephone line for automatically answering a telephone call and placing said call on hold; power relay means operatively associated with said line hold means for switching power to said coding device in response to actuation of said line hold means; audio relay means cooperating with said line hold means and telephone line for transferring sound to and from said telephone line; first and second amplifier means cooperating with said audio relay means for amplifying an audio signal comprising a special number code dialed by a caller to access said coding device; receiver and detector means cooperating with said first and second amplifier means for receiving and detecting the presence of said special number code on said telephone line; a memory associated with the outputs of said receiver and detector means for temporarily storing said special number code; a plurality of indicia bearing switching means for preselecting said special number code by the user of said coding device; comparator means cooperating with the outputs of said memory and said plurality of indicia bearing switching means for comparing a dialed special number code with a preselected special number code and providing a logic signal when both codes are identical; a first timing means actuated by said logic signal for providing a predetermined timed interval when said codes are identical; sound generator and third amplifier means actuated by said first timing means for generating and amplifying simulated ring signals in response to a correctly dialed special number code, said sound generator and third amplifier means further cooperating with said audio relay means, line hold means, and telephone line for transferring said simulated ring signals to said telephone line for the benefit of a caller accessing said coding device; a transducer operatively associated with said sound generator and third amplifier means for reproducing said simulated ring signals for the benefit of the coding device user; a second timing means cooperating with said first timing means, associated gating means, and said line hold means for automatically releasing said telephone line subsequent to a predetermined timed delay when said special number code is incorrectly dialed; and a second ringer silencing means connected in series between said telephone line and an extension telephone for silencing a ringer mechanism of an extension telephone cooperating with said telephone set.

2. The telephone number coding device according to claim 1, wherein said first timing means further cooperate with said second timing means, said associated gating means, and said line hold means for automatically releasing said telephone line subsequent to said predetermined timed interval when said telephone set is not answered in response to said simulated ring signals.

3. The telephone number coding device according to claim 1, wherein said receiver and detector means further include a dual tone multi-frequency receiver and tap detector circuit, whereby standard dual tone multi-frequency tones of said special number code dialed by a caller attempting to access said coding device are amplified by said first amplifier, received by said dual tone multi-frequency receiver, and stored by said memory when a tone telephone is used by said caller, and whereby a series of rapid taps, equal in number to each digit of said special number code produced by a caller tapping on a telephone mouthpiece when attempting to access said coding device, are amplified by said second amplifier, detected by said tap detector circuit, counted by an associated counter, and stored in said memory when a non-tone telephone is used by said caller.

4. The telephone number coding device according to claim 3, wherein said tap detector circuit includes a sound-actuated switch and counting means cooperating with said switch for counting each tap of a rapid series of taps produced by a caller tapping on a telephone mouthpiece, whereby the number of taps in a given series is equal to any of the digits "0" through "9" being produced, except the digit "0" being equal to ten taps, wherein said counting means temporarily store the total of each of said series of taps in binary-coded decimal.

5. The telephone number coding device according to claim 4, wherein said tap detector circuit further includes missing pulse detection means cooperating with said counting means, whereby said missing pulse detection means produce a logic signal when said series of taps is followed by a minimum predetermined pause indicating completion of the "dialing" of a single digit, said logic signal cooperating with said memory for transferring said binary-coded decimal to said memory when said logic signal is present, and whereby said logic signal further cooperates with said counting means, resetting said counting means to zero when said logic signal is present for preparing said counting means to receive a new series of rapid taps representing a successive digit being "dialed."

6. The telephone number coding device according to claim 5, wherein said tap detector circuit further includes propagation delay and gating means cooperating with said dual tone multi-frequency receiver for disabling the output of said tap detector circuit when dual tone multi-frequency tones are present on said telephone line.

7. The telephone number coding device according to claim 1, wherein said first ringer silencing means include a rectifier, the inputs of said rectifier being connected to said telephone line and the outputs of said rectifier being connected to said telephone set for rectifying AC ring signals appearing on said telephone line.

8. The telephone number coding device according to claim 7, wherein the inputs of said telephone set and coding device are switchable, whereby said rectifier is operatively connected between said telephone line, telephone set and coding device in a first switch position, and whereby said telephone set is operatively connected only to said telephone line, bypassing said rectifier and coding device, in a second switch position for selectively enabling and disabling said first ringer silencing means and said coding device at the user's discretion.

9. The telephone number coding device according to claim 1, wherein said second ringer silencing means include a separate housing equipped with a telephone modular jack and modular plug, said modular jack being operatively connected to said modular plug by way of a rectifier for rectifying AC ring signals appearing on said telephone line when an extension telephone is plugged into said modular jack and said modular plug is plugged into said telephone line.

10. The telephone number coding device according to claim 1, wherein said line hold means include a silicon controlled rectifier, whereby said silicon controlled rectifier is connected across the outputs of said first ringer silencing means, the gate of said silicon controlled rectifier being connected to and triggered by said ring detector means in response to ring signals appearing on said telephone line, whereby said silicon controlled rectifier maintains said telephone line in a hold mode in response to a received telephone call until holding current derived from said telephone line drops below a predetermined level in response to an off-hook position of said telephone set, when a call is answered at said coding device, and in response to an off-hook position of said extension telephone, when a call is answered at a remote location, wherein reduction of said holding current immediately commutates said silicon controlled rectifier when said telephone set or said extension telephone is answered.

11. The telephone number coding device according to claim 10, wherein said line hold means further include an optoisolator comprising a lightemitting diode optically coupled to a phototransistor, said diode being connected in series with said silicon controlled rectifier and the outputs of said first ringer silencing means, the output of said phototransistor being connected to a driver transistor of said power relay means for providing a logic signal to switch power to said coding device when said silicon controlled rectifier is conducting in response to a detected incoming telephone call.

12. The telephone number coding device according to claim 11, wherein said line hold means further include the contacts of a relay connected in series with said optoisolator and silicon controlled rectifier, said relay being operatively associated with gating means of said first timing means and said second timing means for automatically commutating said silicon controlled rectifier subsequent to a first, predetermined timed interval when said special number code is incorrectly dialed and subsequent to a second, predetermined timed interval when said telephone set is not answered in response to said simulated ring signals.

13. The telephone number coding device according to claim 1, wherein said ring detector means further include time delay means actuated by ring signals appearing on said telephone line, the output of said time delay means cooperating with said line hold means, whereby said time delay means maintain said telephone line in a hold mode for a short, predetermined timed interval during momentary telephone line DC bias dropout which may occur when said telephone line is placed on hold.

14. The telephone number coding device of claim 1, wherein said plurality of indicia bearing switching means include a plurality of ten-position, binary-coded decimal thumbwheel switches cooperating with data inputs of said comparator means for preselecting said special number code by the user of said coding device.

15. The telephone number coding device according to claim 1, wherein said sound generator and third amplifier means include ganged variable resistors in series with the output of said third amplifier and said transducer for volume adjustment of said simulated ring signals by the user of said coding device.

16. The telephone number coding device according to claim 15, wherein said sound generator and third amplifier means further include a resistance-capacitance oscillator circuit, the resistor thereof being selectively variable for pitch adjustment of said simulated ring signals by the user of said coding device.

* * * * *